Patented Sept. 3, 1929.

1,727,073

UNITED STATES PATENT OFFICE.

HERBERT HART MAYER AND ROSS GEORGE LA MOTTE, OF HELENA, MONTANA, ASSIGNORS OF TWO-THIRDS TO SAID MAYER AND ONE-THIRD TO SAID LA MOTTE.

PROCESS FOR THE RECOVERY OF ZINC FROM SLAGS.

No Drawing.   Application filed August 10, 1926.   Serial No. 128,518.

This invention relates to a novel process for the recovery of zinc from slags as formed in the smelting of complex ores, and primarily has in view a practical and economical process for that purpose.

In order to render the process particularly valuable for the recovery of zinc in slags such as the slags produced in the smelting of complex ores, one of the distinctive objects thereof is to provide for converting part or all of the original zinc compounds into soluble salts of zinc and recovering these salts in a form adaptable to standard methods for extracting metallic zinc from solutions carrying zinc salts. Furthermore, it is the purpose of the invention to provide means for transforming the other metals contained in the slags into other soluble salts and to decompose these salts rendering them practically insoluble so that they may be held back in the residue during the leaching and filtering periods of the process, thereby permitting the zinc to be brought down into a form that can be handled by standard methods of recovering zinc.

Another important object of the invention is to provide means for recovering part of the sulphuric acid, employed in the process, either as a marketable acid or in such a form that it can be returned into the process cycle, and re-used in carrying on the continued operation.

Another desirable factor in carrying out the invention is that the amount of iron sulphate entering solution with the zinc can be controlled so that it does not interfere in the recovery of pure zinc by standard methods.

In the practice of the invention two principal operations are involved, namely:—

1. The crushed, ground or granulated slag is first fumed with sulphuric acid to form sulphates of the metals, and 2. The sulphated product is heated to decompose part or all of the sulphates of the metals into the oxides thereof.

The slag is first prepared for the fuming operation by grinding, crushing or granulating to such fineness as is found most economical for the subsequent treatment operations. Crushing or grinding, or both, may be conducted in either a wet or dry way, and in any appropriate types of apparatus. The fineness to which the slag is crushed, ground or granulated will be governed by the character of the slag undergoing treatment.

The thus prepared slag is now subjected to the action of sulphuric acid, in any appropriate form thereby producing a pulp-like mass. The strength of the sulphuric acid employed depends to some extent upon the tendency of the slag to gelatinize and may vary through a considerable range in the treatment of different slags. The time required for the subsequent fuming operation will also be a governing factor in determining the strength of sulphuric acid to be employed. The principles of the invention are, however, not altered by variations in the concentration of the sulphuric acid employed. The sulphuric acid need not be pure, since such impurities as are usually present in crude sulphuric acid are eliminated in the subsequent treatment operations so that the regenerated or recovered sulphuric acid is of relatively high purity. The amount of sulphuric acid necessary is governed by the theoretical quantity necessary to form sulphates of all the metals present in the slag and an excess depending upon the speed with which the sulphating is to be carried on.

After the slag has been mixed with the sulphuric acid, the resulting mixture is subjected to heat and the fuming operation started. The fuming may be conducted in the same furnace in which the subsequent roasting or heat-treatment is carried out. The time of fuming may vary with different slags and is governed largely by the length of time required to drive off any free or unspent acid present. The sulphuric anhydride fumes from the excess sulphuric acid and that from the decomposition of the metallic sulphates as well as the sulphur dioxide are collected in a suitable manner. It is important to carry the fuming treatment long enough to convert all, or practically all, of the zinc present into the form of zinc sulphate. Weak acid solutions will result in longer fuming periods, but do not otherwise change the principles of the process. In this fuming operation all of the metals soluble in sulphuric acids are converted into their respective sulphates, and in particular the iron and aluminum present are converted into their sulphates. The silica content of the slag is rendered insoluble.

Following the fuming operation, the sulphated slag is subjected to a heat treatment in the nature of a decomposition roasting in the course of which the iron and aluminum sulphates are completely, or nearly completely, decomposed into their trioxides which are relatively insoluble in dilute solutions of sulphuric acid. This decomposition of the iron and aluminum sulphates may be effected with slight decomposition of the zinc sulphate. A further advantageous result of the decomposition roasting is that during the change of the iron sulphate to the oxide, insoluble iron compounds of arsenic, antimony, tellurium and selenium are formed thereby giving pure solutions upon subsequent leaching.

As hereinbefore indicated, any suitable type of apparatus may be employed for carrying out the roasting operation. In any case, the operation is carried on at a temperature sufficient to break down the iron and aluminum sulphates into their oxides, in which form these metal compounds are insoluble in water or dilute sulphuric acid. On the other hand, the zinc content of the slag remains in a form readily soluble in water or dilute sulphuric acid.

The sulphuric anhydride fumes driven off during the fuming period, together with the sulphuric anhydride fumes, sulphuric acid gas ($SO_3$) and vapor which may be expelled during the roasting period, are intended to be conveyed in the conventional manner to the usual condensation apparatus, and the sulphuric acid solution thus formed either can be evaporated down to chemically pure acid for market purposes or concentrated to the required strength to be returned to the process cycle either for fuming or leaching of subsequent charges.

After obtaining the roasted product in the manner described it is leached so as to extract therefrom the soluble salts of zinc. In most cases the leaching step can be performed with water or relatively dilute solutions of sulphuric acid, ranging from 0.5% to 20% in strength. The leaching solution may of course be varied in strength to suit the conditions of the roasted product and may be applied in a suitable manner and continued for any suitable length of time according to the conditions and problems confronting the operator.

The residue resulting from the leaching operation is subjected to a filtering step to recover a substantial amount of the leaching solution held in suspension and which solution will be conveyed back to the storage container therefor for re-use. The final solution, coming from the leaching and filtering steps can either be marketed to a zinc reduction works, or the metallic zinc can be extracted on the ground by standard and conventional methods, the product either being shipped as a solution or evaporated down to concentrated zinc sulphate or zinc oxide, or both.

The residue from the filtering operation either can be used by the smelter as an iron flux practically free from zinc or discarded as a waste product.

The foregoing steps which have been particularized are essential to the practical and economical performance of the process, because without them the impurities, especially the iron and silica, would remain in the soluble form and would interfere with the recovery of the zinc. Furthermore, it will be observed that this process develops practically no waste products, therefore being very economical in operation, while at the same time providing a thoroughly practical way of recovering the zinc content particularly from slags as formed in the smelting of complex ores.

We claim:—

1. A process for the recovery of zinc from a slag containing a substantial amount of iron which consists in subjecting the slag to the action of sulphuric acid and thereby forming sulphates of the zinc and iron present in the slag, subjecting the thus sulphated slag to a heat treatment operation in the course of which the iron sulphate is substantially decomposed into iron oxide, and recovering the zinc by leaching from the resulting heat-treated product.

2. A process for the recovery of zinc from slag formed in the smelting of complex ores which comprises treating the slag with sulphuric acid to form sulphates of all the metals present in the slag, subjecting the sulphated slag to a decomposition roasting in the course of which the metal sulphates, other than zinc, are converted into oxides insoluble in dilute sulphuric acid, and recovering the zinc from the resulting product by leaching.

3. The process for treating zinc-bearing slag which comprises treating the slag with sulphuric acid to form zinc sulphate, heating the resulting product, and leaching the product of the heat treatment to recover zinc.

4. The process for treating zinc-bearing slag which comprises treating the slag with sulphuric acid to form sulphates of zinc and other metals contained therein, heating the resulting product to form insoluble compounds of metals other than zinc, and recovering zinc from the product of the heat treatment by leaching.

5. The process for treating zinc-bearing slag which comprises treating the slag with sulphuric acid to form zinc sulphate, heating the resulting product to convert at least a portion of the zinc sulphate to zinc oxide, and recovering zinc from the resulting product by leaching with an acid solution.

6. The process for treating zinc-bearing slag which comprises treating the slag with sulphuric acid to form sulphates of zinc and other metals contained therein, heating the resulting product to form zinc oxide and insoluble compounds of metals other than zinc, and recovering zinc from the product of the heat treatment by leaching the dilute sulphuric acid.

7. The process for treating zinc-bearing slag which comprises converting the zinc and other metals contained in the slag to the sulphate form, roasting the resulting product to convert at least a portion of the zinc sulphate to zinc oxide, and recovering zinc from the roasted product by leaching with dilute sulphuric acid.

8. The process for treating zinc-bearing slag which comprises mixing the slag with a quantity of sulphuric acid in excess of that required to form sulphates of zinc and other metals contained in the slag, subjecting the resulting mixture to a fuming operation, roasting the resulting product to decompose certain of the metallic sulphates contained therein, and recovering zinc from the roasted product by leaching.

9. The process for treating zinc-bearing slag which comprises mixing the slag with a quantity of sulphuric acid in excess of that required to form sulphates of zinc and other metals contained in the slag, subjecting the resulting mixture to a fuming operation to effect the desired conversion of metals to the sulphate form, roasting the sulphated product to decompose certain of the metallic sulphates, and recovering zinc from the roasted product by leaching.

10. The process for treating zinc-bearing slag which comprises mixing the slag with a quantity of sulphuric acid in excess of that required to convert zinc and other metals contained in the slag to the sulphate form, subjecting the resulting mixture to a fuming operation to effect the desired conversion of metals to the sulphate form, roasting the resultant product to convert at least a portion of the zinc sulphate to zinc oxide, and recovering zinc from the roasted product by leaching with a sulphuric acid solution.

In testimony whereof we hereunto affix our signatures.

HERBERT HART MAYER.
ROSS GEORGE LA MOTTE.